(12) United States Patent
Ojo et al.

(10) Patent No.: US 7,668,514 B2
(45) Date of Patent: Feb. 23, 2010

(54) ANALOG RECEIVED SIGNAL STRENGTH INDICATION IN AN RF TRANSCEIVER

(75) Inventors: Adedayo Ojo, San Diego, CA (US); Arya Reza Behzad, Poway, CA (US)

(73) Assignee: Broadcom Corporation, Irvine, CA (US)

(*) Notice: Subject to any disclaimer, the term of this patent is extended or adjusted under 35 U.S.C. 154(b) by 537 days.

(21) Appl. No.: 11/264,392

(22) Filed: Nov. 1, 2005

(65) Prior Publication Data

US 2007/0004357 A1  Jan. 4, 2007

Related U.S. Application Data

(60) Provisional application No. 60/696,263, filed on Jul. 1, 2005.

(51) Int. Cl.
  *H04B 17/00* (2006.01)
(52) U.S. Cl. ............... 455/73; 455/226.3; 455/78; 455/83; 455/134; 455/333
(58) Field of Classification Search ............... 455/73, 455/78, 83, 134, 296, 303
  See application file for complete search history.

(56) References Cited

U.S. PATENT DOCUMENTS

| | | | | |
|---|---|---|---|---|
| 5,621,764 A * | 4/1997 | Ushirokawa et al. | ......... | 375/317 |
| 7,020,449 B2 * | 3/2006 | Shi | ............ | 455/234.1 |
| 7,155,196 B1 * | 12/2006 | Beard | ............ | 455/339 |
| 7,218,896 B1 * | 5/2007 | Venkatesh | ............ | 455/73 |
| 7,254,164 B2 * | 8/2007 | Behzad | ............ | 375/219 |
| 7,356,310 B2 * | 4/2008 | Rofougaran et al. | ......... | 455/66.1 |
| 2003/0138032 A1 * | 7/2003 | Shi et al. | ............ | 375/219 |
| 2003/0138034 A1 * | 7/2003 | Shi et al. | ............ | 375/219 |
| 2004/0152437 A1 * | 8/2004 | Behzad | ............ | 455/326 |
| 2006/0171492 A1 * | 8/2006 | Behzad et al. | ............ | 375/343 |
| 2007/0058703 A1 * | 3/2007 | Behzad et al. | ............ | 375/219 |
| 2007/0201565 A1 * | 8/2007 | Shi et al. | ............ | 375/259 |
| 2007/0243848 A1 * | 10/2007 | Behzad | ............ | 455/326 |
| 2008/0130599 A1 * | 6/2008 | Horikoshi et al. | ............ | 370/338 |
| 2008/0139159 A1 * | 6/2008 | Ojo et al. | ............ | 455/313 |

* cited by examiner

*Primary Examiner*—Matthew D Anderson
*Assistant Examiner*—Erica Fleming-Hall
(74) *Attorney, Agent, or Firm*—Garlick Harrison & Markison; James A. Harrison

(57) ABSTRACT

An integrated circuit radio transceiver and method therefor comprises a receiver front end that further includes a plurality of in-phase and quadrature phase receive processing block operable at first and second frequency bands wherein each of the receive processing blocks defines an ingoing signal path and further includes a plurality of filtering and amplification blocks disposed within the corresponding ingoing signal path, a plurality of RSSI blocks coupled to receive an ingoing analog signal from a corresponding plurality of nodes disposed throughout the ingoing signal path, each of the plurality of received signal strength indicator blocks producing a signal strength indication, and wherein a baseband processor is operable to receive a selected signal strength indication and to produce at least one gain setting to at least one amplification block within the in-phase or quadrature phase receive processing blocks. In operation, the baseband processor receive a signal strength indication from each RSSI block to determine a total amount of gain and appropriate gain distribution within the receive signal path.

21 Claims, 12 Drawing Sheets

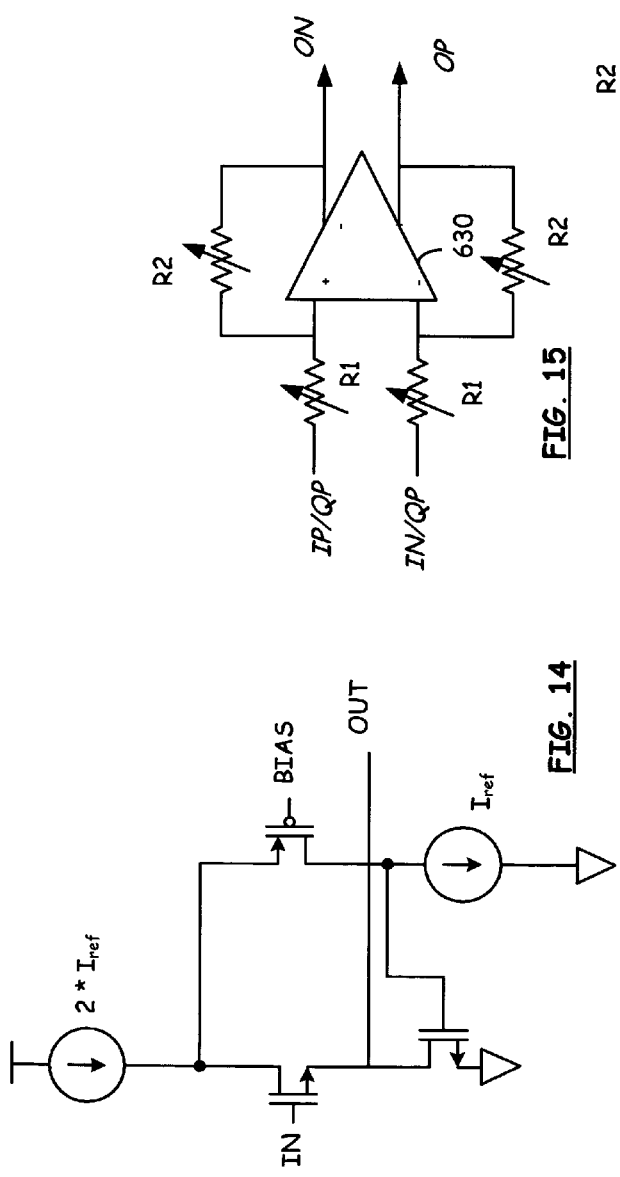
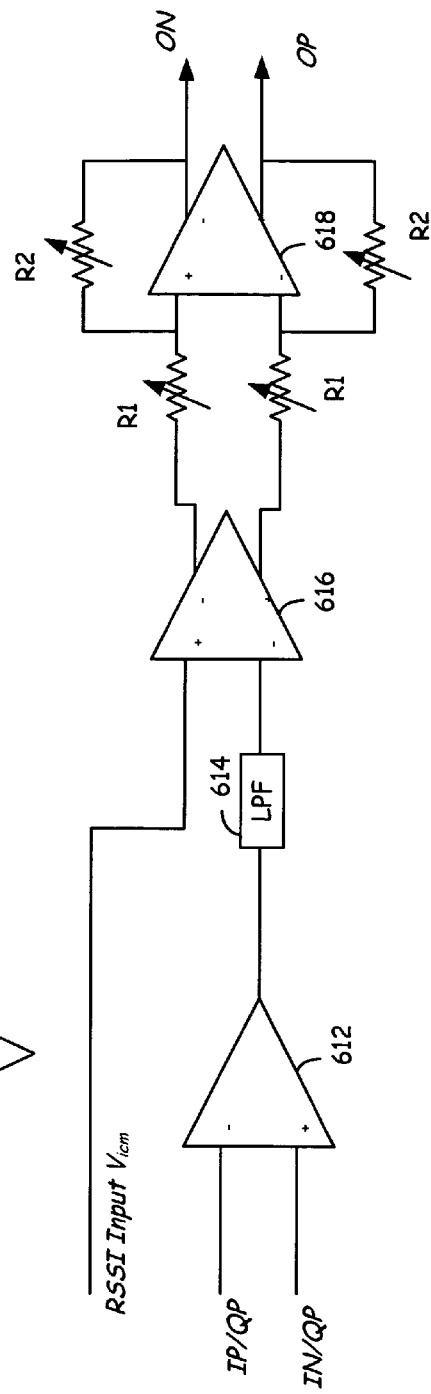
FIG. 15
FIG. 14
FIG. 12

ANALOG RECEIVED SIGNAL STRENGTH INDICATION IN AN RF TRANSCEIVER

CROSS REFERENCE TO RELATED APPLICATION

This application claims priority to U.S. Provisional Patent Application Ser. No. 60/696,263, filed Jul. 1, 2005, which is incorporated herein by reference for all purposes.

BACKGROUND

1. Technical Field

The present invention relates to wireless communications and, more particularly, to circuitry for measuring and detecting a received signal strength.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

One common problem in processing a received signal in a receive signal path is that signal to noise ratios fluctuate according to an amount of present noise and/or according to fluctuations only in signal strength. At the same time, if an amplification level were left constant, then an amplified signal may experience clipping when noise levels exceed a certain threshold. To avoid this problem, it is possible to reduce amplification levels to avoid clipping even in situations where ambient noise levels are high. Unfortunately, however, this approach results in a received signal being amplified a lesser amount. Moreover, even without considering interference, an ingoing signal may vary in magnitude by a wide range. Accordingly, preset amplification levels would tend to under-amplify small scale signals and over-amplify large scale signals. What is needed, therefore, is a radio receiver with circuitry that is operable to compensate for variations in environmental noise conditions and signal magnitude in order to allow a received signal to be amplified a maximum amount without clipping in the presence of varying noise levels.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 12 is a functional block diagram of amplification circuitry for wide-band RSSI blocks according to one embodiment of the invention;

FIG. 14 is a schematic diagram of a level shifter as implemented in one embodiment of the invention; and FIG. 15 is a differential amplifier that is used in one embodiment of the invention for providing amplification of a narrow band RSSI signal.

DETAILED DESCRIPTION OF THE DRAWINGS

Figure 1:
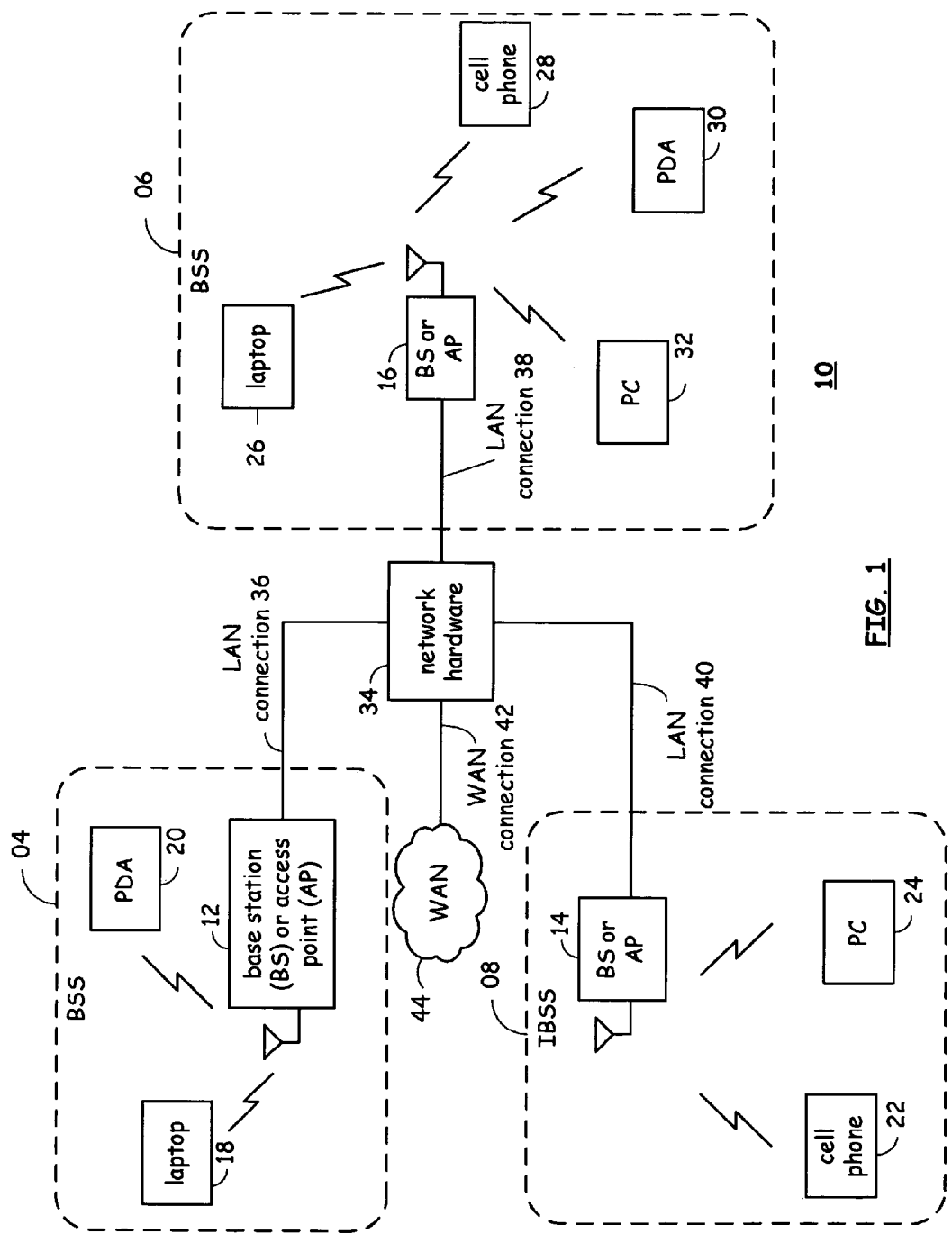
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
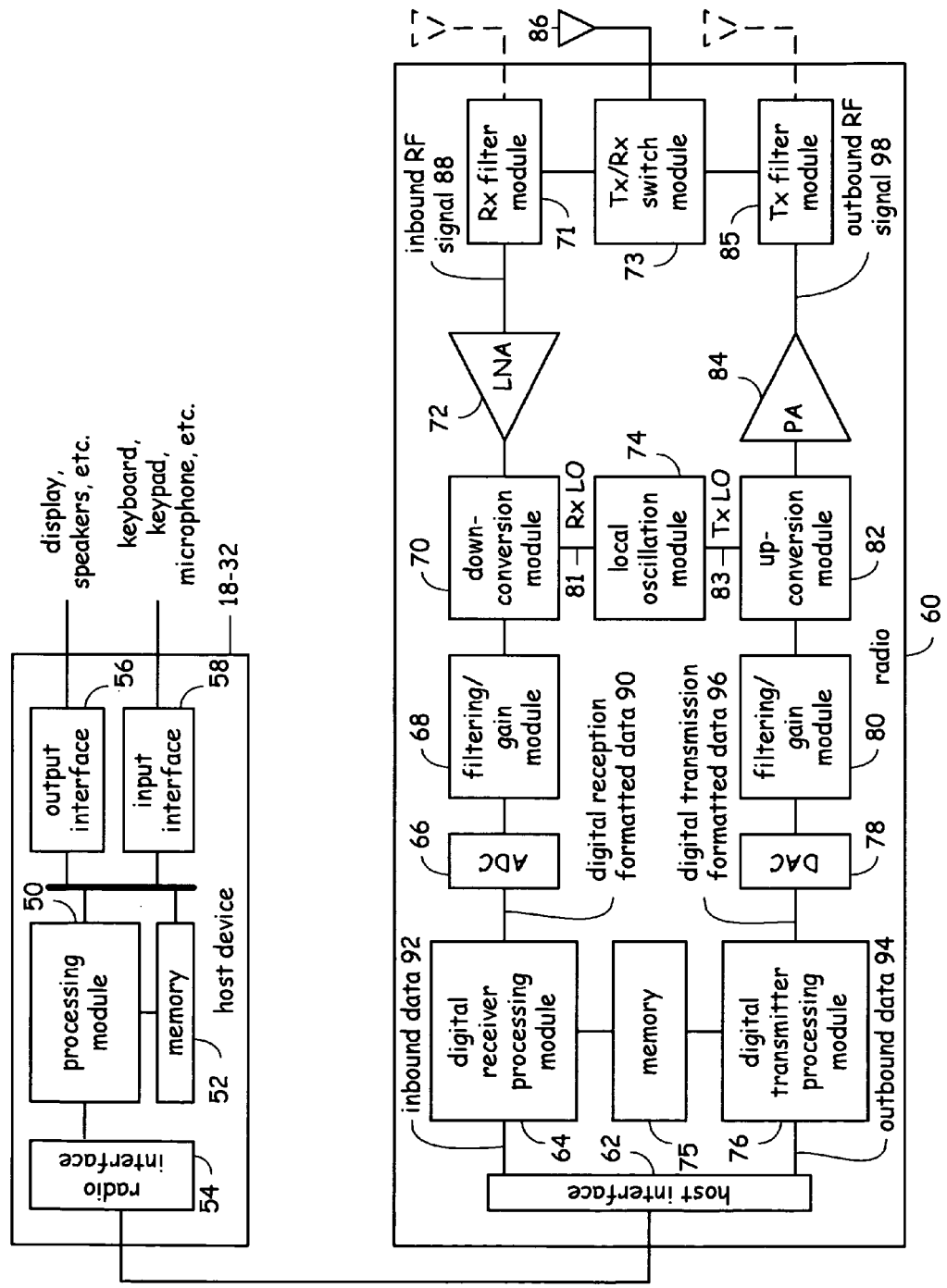
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
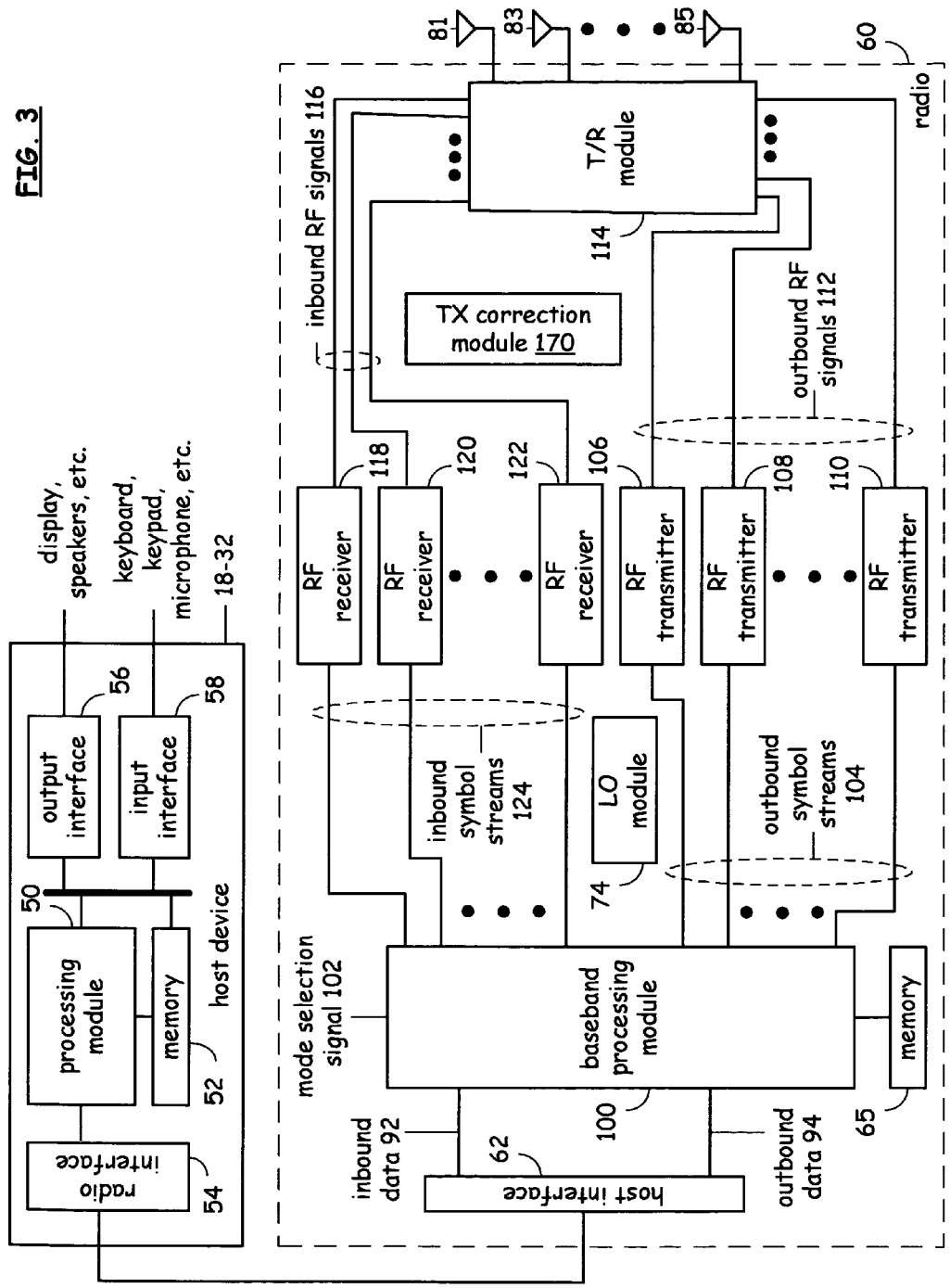
FIG. 3 is a schematic block diagram illustrating a wireless communication device that includes a host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
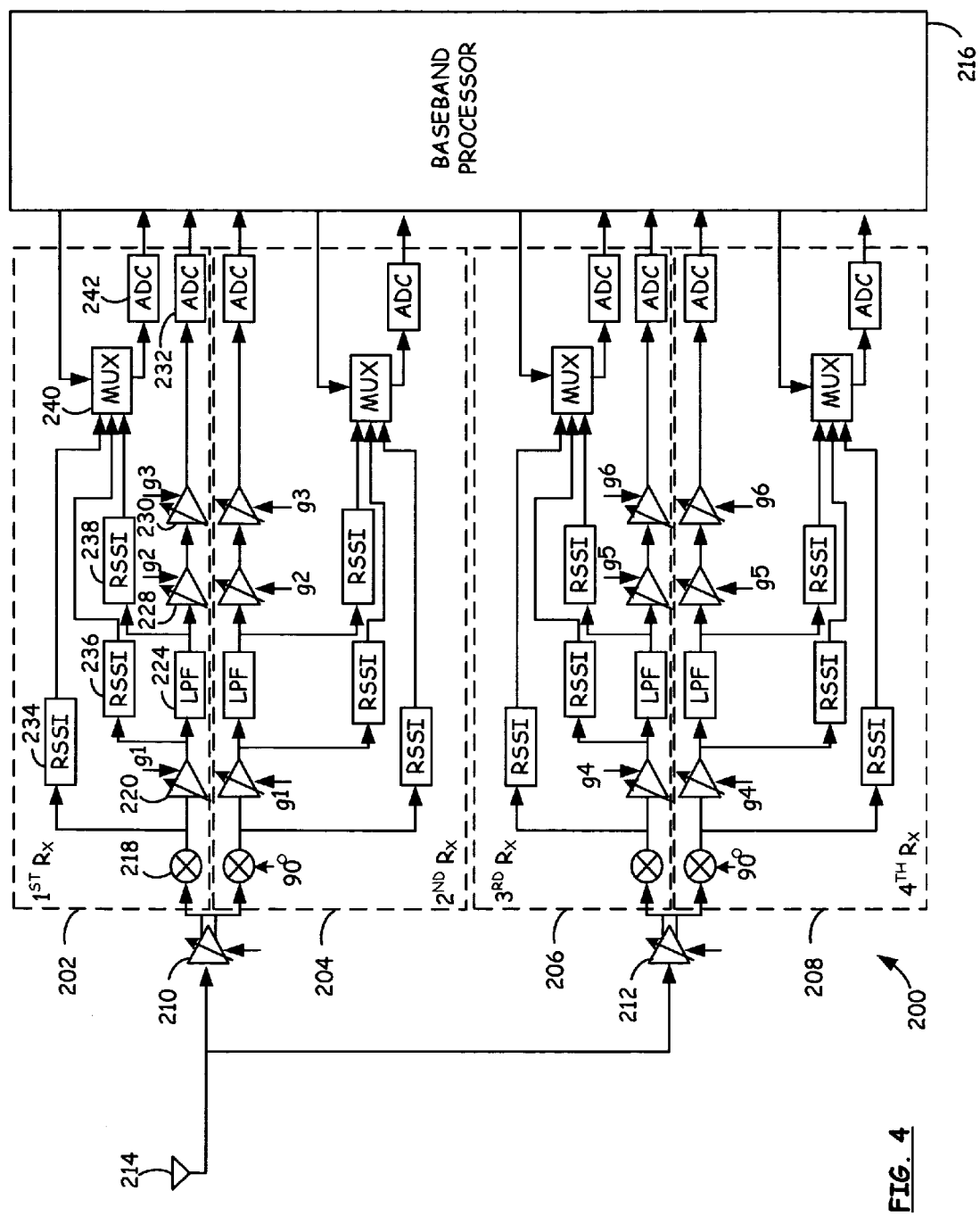
FIG. 4 is a functional block diagram of an integrated circuit radio receiver portion of a radio transceiver, and more specifically, of a receiver front end for receiving ingoing RF signals according to one embodiment of the present invention.

FIG. 4 is a functional block diagram of an integrated circuit radio receiver portion of a radio transceiver, and more specifically, of a receiver front end for receiving ingoing RF signals according to one embodiment of the present invention. A receiver front end 200 includes four receive processing blocks 202, 204, 206 and 208. More specifically, a first receive processing block 202 is for processing in-phase receive signals, while a second processing block 204 is for processing quadrature phase receive signals. Both processing blocks 202 and 204 are operable to receive and process ingoing signals received at a first receive frequency. For example, the first receive frequency is equal to 2.4 gigahertz in one embodiment of the invention. A third receive processing block 206 is operable to receive and process in-phase receive signals received at a second receive frequency, while a fourth receive processing block 208 is for processing quadrature phase receive signals also received at the second receive frequency. For exemplary purposes, the second frequency is equal to 5.0 gigahertz in one embodiment of the invention.

It should be understood that portions of the four receive processing blocks may be combined. For example, in one embodiment of the invention, the portions of the receive processing blocks 202 and 206 (in-phase signal paths for the 802.11(a) and 802.11(g) radios in the described embodiment) downstream of the mixers may be combined for embodiments in which 802.11(a) and 802.11(g) communications will not occur at the same time. Similarly, receive processing blocks 204 and 208 may be combined to achieve similar efficiency for quadrature phase signal processing. In one embodiment in which simultaneous communications over 802.11(a) in a 5 GHz channel and 802.11(b) or 802.11(g) in a 2.4 GHz channel are not expected to occur, such components may be combined to save IC real estate. In an alternate embodiment, however, such components are not combined to enable simultaneous communications in 2.4 and 5.0 GHz frequency bands in accordance with corresponding communication standards.

Each of the processing blocks 202-208 are operably coupled to receive an amplified ingoing RF signal from a corresponding low noise amplifier that in turn is operably coupled to an antenna. In the example of FIG. 4, first and second processing blocks 202 and 204, respectively, are operably coupled to low noise amplifier 210. Similarly, the third and fourth processing blocks 206 and 208, respectively, are operably coupled to low noise amplifier 212. Each of the low noise amplifiers 210 and 212 are operably coupled to receive ingoing RF signals from one or more antennas simply shown as antenna 214 in FIG. 4. As may further be seen, each of the processing blocks 202-208 are operably coupled to produce a corresponding digital ingoing signal to baseband processor 216.

While FIG. 4 illustrates a single ended radio receiver circuit, it is understood that the circuit may be implemented in a differential configuration. One preferred embodiment of the invention includes a differential radio receiver whose operation is adequately described here as a single ended circuit for simplicity. One of average skill in the art may readily expand the present teachings to a differential configuration.

Continuing to refer to FIG. 4, each of the four processing blocks 202-208 includes substantially similar circuitry that is operable to process an ingoing signal to produce a corresponding digital ingoing signal to the baseband processor 216. Each of the four processing blocks 202-208 are further operable to produce a received signal strength indication from a node that is selected from a plurality of nodes that are disposed in the corresponding ingoing circuit path. Specifically, examining the first frequency in-phase receive processing block 202, a mixer 218 is coupled to receive the amplified output from low noise amplifier 210. Mixer 218 is further coupled to receive an oscillation (not shown for simplicity) to down convert the amplified output received from the low noise amplifier from RF to an intermediate frequency or baseband frequency signal. The down converted signal is then produced to a variable gain amplifier 220. Variable gain amplifier 220 is further coupled to receive a gain setting g1 that is generated by baseband processor 216 and produces an amplified output based upon the gain setting g1. Variable gain amplifier 220 then produces a first amplified output that is conducted through a first node to a low pass filter 224.

Low pass filter 224 produces a filtered output that is conducted through a second node to a variable gain amplifier 228. Variable gain amplifier 228 is further coupled to receive a second gain setting g2 that is generated by baseband processor 216. The variable gain amplifier 228 produces a second amplified output based upon the filtered output and further based upon the gain setting g2 to a third variable gain amplifier 230. Third variable gain amplifier 230 is further coupled to receive a third gain setting g3 from baseband processor 216. Third variable gain amplifier 230 then produces a third amplified output based upon the gain setting g3 and further based upon the second amplified output to an analog-to-digital converter 232. Analog-to-digital converter 232 then produces a digital ingoing signal to baseband processor 216.

Continuing to examine FIG. 4, first processing block 202 includes a first received signal strength indicator block 234, a second received signal strength indicator block 236, and a third received signal strength indicator block 238. Each of the received signal strength indicator blocks may also be referenced herein as an RSSI or as an RSSI block. Each of the RSSI blocks 234-238 is operably coupled to receive an ingoing signal from one of a first, a second or a third node, respectively, that is disposed within the received signal path of the first processing block 202. In the example shown, RSSI 234 is coupled to receive the ingoing signal from a node between the output of mixer 218 and the input of variable gain amplifier 220. Similarly, RSSI block 236 is operatively coupled to receive the output of first variable gain amplifier 220 from a node disposed between the output of the first variable gain amplifier 220 and the input of low pass filter 224. Each of the input signals received by RSSIs 234 and 236 are wideband signals. The third RSSI block 238 is operably coupled to receive the ingoing signal from a node disposed between the output of low pass filter 224 and the input of the second high pass variable gain amplifier 228. The ingoing signal received by RSSI block 238 is a narrow band signal.

Each of the RSSI blocks 234-238 produces a received signal strength indication to a switching device 240 that is operably controlled by the baseband processor 216. Baseband processor 216 generates an RSSI select signal to switching device 240. In the described embodiment of the invention, switching device 240 is a demultiplexer (or more loosely, a mux or multiplexer) that is operably coupled to receive each of the received signal strength indication outputs of RSSI blocks 234-238. Switching device 240 then produces a single received signal strength indication based upon the RSSI select signal received from baseband processor 216. As shown, the single received signal strength indication, in the embodiment of FIG. 4, is produced to an analog-to-digital converter 242 that converts the received signal strength indication to a digital received signal strength indication.

The structure and operation of the remaining three receive processing blocks 204-208 are substantially similar in structure to processing block 202. The second receive processing block 204 is substantially similar to first receive processing block 202 except that the mixer is operably coupled to receive an oscillation signal that is phase shifted by 90 degrees relative to the oscillation signal received by mixer 218 of receive processing block 202. Receive processing block 206 and receive processing block 208 are also similar but are operably coupled to receive an oscillation and a phase shifted oscillation for down converting a received RF signal of a different frequency. For example, in one embodiment, first and second receive processing blocks 202 and 204, respectively, receive an oscillation for down converting an RF signal that is approximately equal to 2.4 gigahertz, while third and fourth receive processing blocks 206 and 208, respectively, are operably coupled to receive an oscillation for down converting an RF signal that is approximately equal to 5.0 gigahertz. As such, for example, first and second receive processing blocks 202 and 204, respectively, may operate to receive and process ingoing RF signals according to either 802.11(b) or 802.11(g) or Bluetooth protocols/standards in the described embodiment. Third and fourth receive processing blocks 206 and 208, respectively, may operate to receive RF signals according to the 802.11(a) standard.

Because the receiver front end of FIG. 4 includes in-phase and quadrature phase receive path processing blocks for at least two received RF frequency bands, a total of 12 RSSI blocks are required if each receive path is to produce one of three received signal strength indications in the described embodiment. Baseband processor 216, therefore, is operable to control gain level settings of 12 variable gain amplifiers based upon one or more of the signal path received signal strength indications in the described embodiment of the invention. While the described embodiment of FIG. 4 shows three RSSI blocks connected as shown, it should be understood that a different number of RSSI blocks may be used and that the RSSI blocks may be operatively coupled to produce received signal strength indications from other nodes disposed within the ingoing signal path of the receiver front end. To avoid substantially duplicative explanations, the connectivity of the remaining three receive path processing blocks will not be described. Generally, though, the frequency of operation for the received RF is a function of the oscillation. For the given oscillation, in-phase or quadrature phase operation is merely a function of the relative phase of the oscillation. One of average skill in the art may readily expand the discussion of first receive path processing block 202 to appreciate the operation of the remaining receive path processing blocks 204-208.

Figure 5:
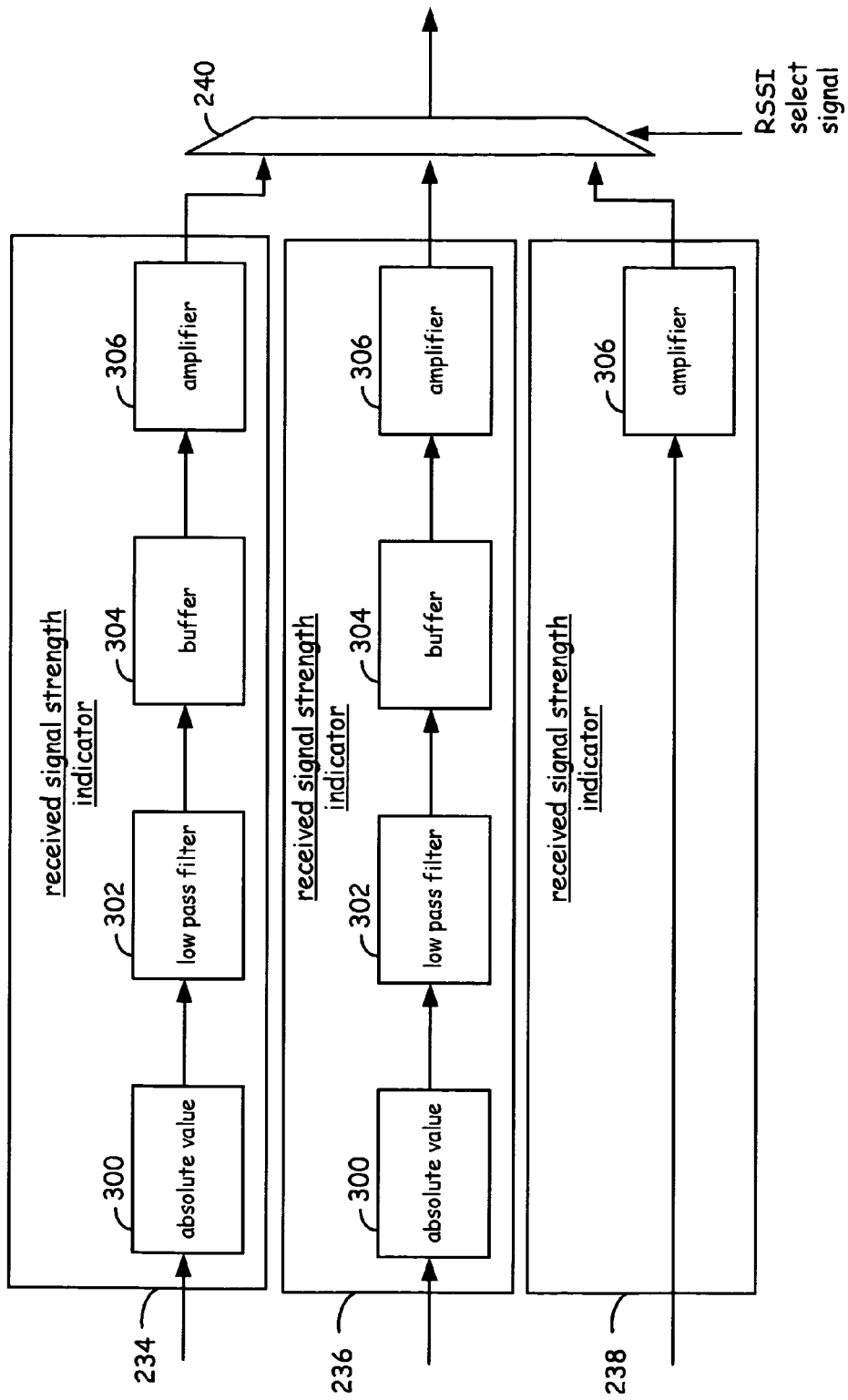
FIG. 5 is a functional block diagram that illustrates the received signal strength indicator blocks according to one embodiment of the invention.
Figure 13:
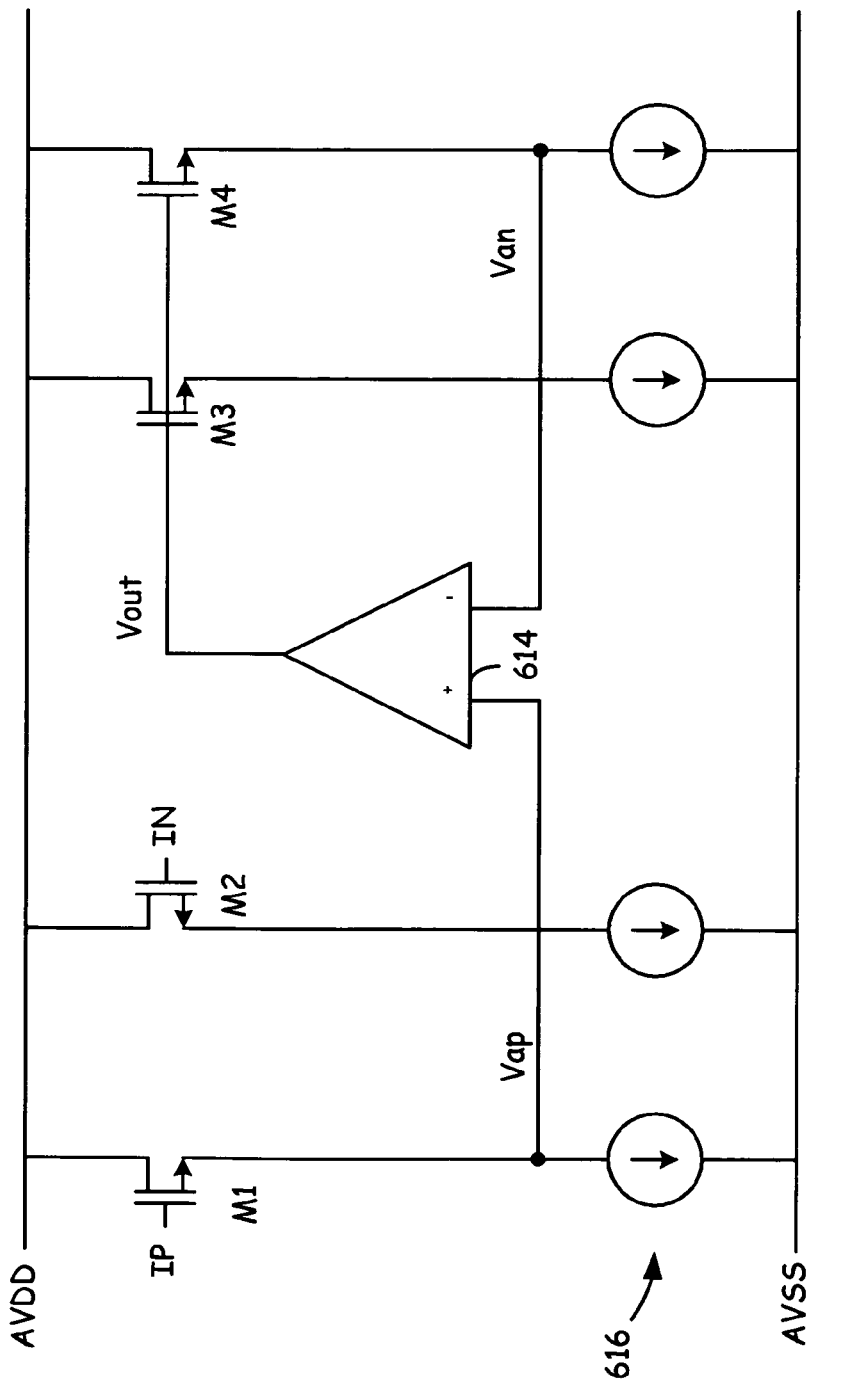
FIG. 13 is a functional schematic diagram of an envelope detector according to one embodiment of the invention.

FIG. 5 is a functional block diagram that illustrates the received signal strength indicator blocks according to one embodiment of the invention. For exemplary purposes, RSSI blocks 234, 236 and 238 of the first receive path processing block 202 are shown and described here in FIG. 5. First RSSI block 234, second RSSI block 236 and third RSSI block 236 are each operatively coupled to produce a received signal strength indication to switching device 240 as also shown in relation to FIG. 4. First and second RSSI blocks 234 and 236, respectively, comprise a dc cancellation absolute value block 300, a programmable low pass filter block 302, a buffer 304 and a programmable gain amplifier 306, all coupled sequentially in series. The envelope detector block 300 (as further described in relation to FIG. 13 below) gives an absolute value of the differential inputs, with a DC shift and minimal compression during the input transitions. However, the gate-to-source voltage of the input devices $M_1$ and $M_2$ is quite large, introducing significant distortion. A pseudo replica circuit consisting of an identical differential voltage follower ($M_3$ & $M_4$) and a feedback amplifier is used to provide a first-order cancellation of the DC voltage and distortion due to the input devices. The feedback amplifier keeps the voltages Vap and Van as seen in FIG. 13 equal, by driving the gate of the replica circuits to the envelope of the differential signals.

The output of the differential envelope detector is filtered further in low pass filter 302 to provide better averaging. Without the filter, the amplifier loop bandwidth governs the settling characteristics of this scheme, however with averaging the settling behavior is defined by the filter bandwidth.

Programmable Low pass filter 302 produces the filtered absolute value to buffer 304 that produces a buffered and filtered absolute value of the ingoing signal to variable gain amplifier 306. Variable Gain Amplifier 306, in the described embodiment, produces adequate amplification of the ingoing signal such that the full dynamic range of the Analog ADC is used. The output of the amplifier 306, then, is the received signal strength indication in an analog form.

Each of the RSSI blocks 234 and 236 receives a wideband signal. Accordingly, the output to switching device 240 is a wideband received signal strength indication. RSSI block 238, however, is coupled to receive a narrow band signal (since the ingoing signal is being received from a node disposed downstream (after) the low pass filter of the ingoing signal path of the receive path block). Accordingly, neither the absolute value block 300, low pass filter block 302 nor buffer 304 are required. Thus, only amplifier 308, configured as a –10 dB gain block is included. The output, therefore, is a narrow band received signal strength indication (NBRSSI).

In the described embodiments of the invention, the amplifiers 306 used in the wideband RSSI provide gain up to 12 dB. Further, the absolute value blocks 300 of RSSI blocks 234 and 236 are operable to detect an ingoing signal magnitude from a corresponding node disposed in the ingoing receive signal path. In the described embodiments of the invention, the nodes from which the absolute value blocks 300 receive the ingoing signal are wideband signals (out of band noise as well as in-band signal) and are disposed upstream from the low path filter about both input and output sides of at least one high pass variable gain amplifier that is disposed in the signal path to provide wideband amplification. Additionally, in the described embodiment, two RSSI blocks are formed to receive wideband signals while one RSSI block is formed to receive a narrowband signal (downstream of the low pass filter). It is understood, however, that different configurations may be employed within the scope of the teachings of the present specification and present invention.

Moreover, it should be further clarified that the circuit of FIG. 5 illustrates but one of the four receive signal path blocks illustrated in FIG. 4. Thus, the circuit of FIG. 5 is used for each of the four receive signal path blocks in one embodiment of the invention. In an alternate embodiment, circuits or circuit portions may be used for receive circuit paths that are not required to operate simultaneously in addition to switching circuitry to facilitate the use of the circuit of FIG. 5 for a plurality of ingoing signal path blocks. Finally, the switching block of FIG. 5 is a multiplexer (mux) that is operably coupled to receive the RSSI select signal from the baseband processor (or other processor or logic) in one embodiment. Other known switching/routing mechanisms may also be utilized.

Figures 6, 7:
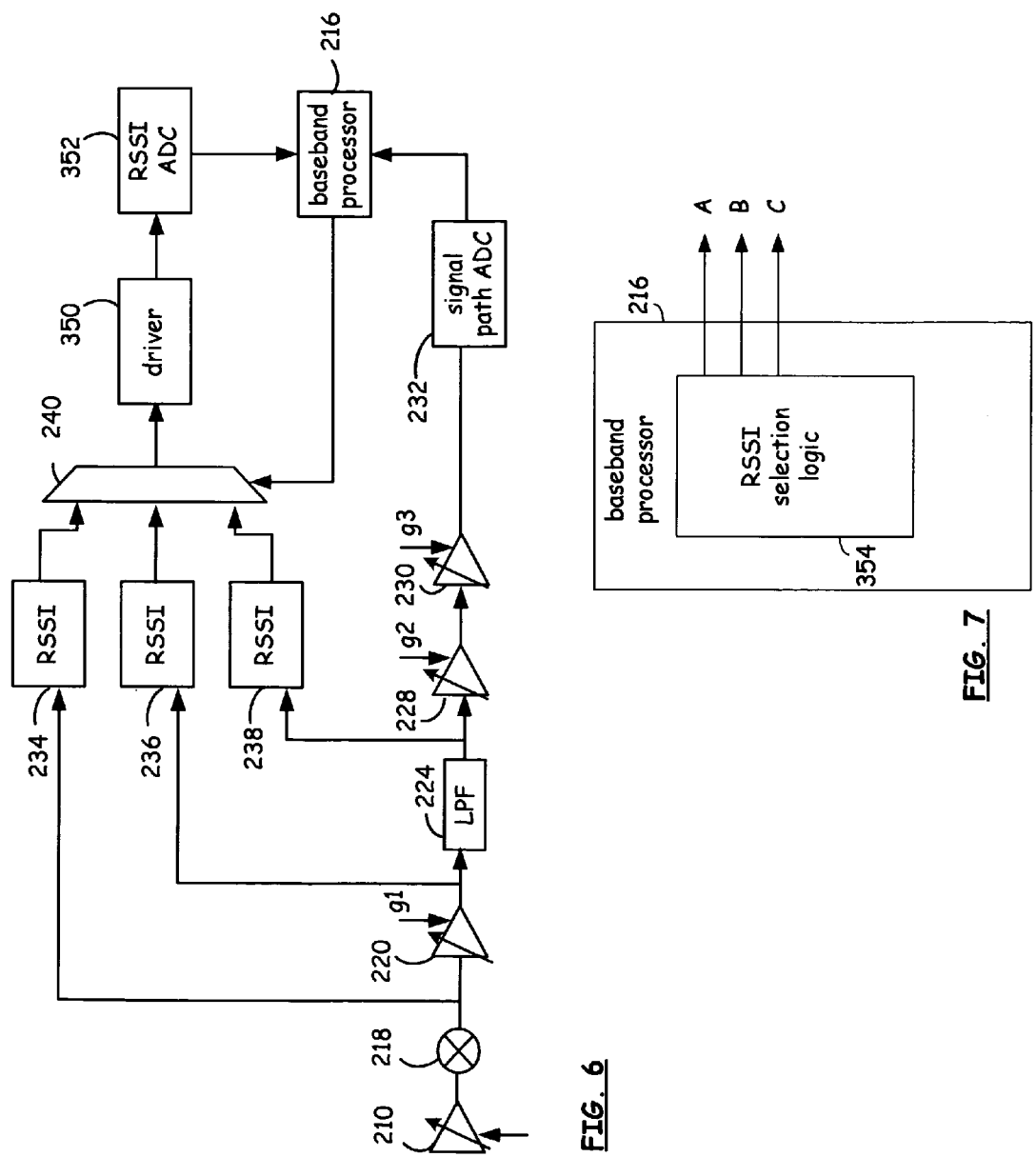
FIG. 6 is a functional block diagram of a received signal path with a plurality of RSSI blocks for providing select RSSI block signal strength indications according to one embodiment of the invention.
FIG. 7 is a functional block diagram illustrating a baseband processor with RSSI selection logic according to one embodiment of the invention.

FIG. 6 is a functional block diagram of a received signal path with a plurality of RSSI blocks for providing select RSSI block signal strength indications according to one embodiment of the invention. As may be seen, the receive signal path of FIG. 6 is similar to that of FIG. 4 and therefore contains many of the same reference numbers. Operation here is the same as FIG. 4 for commonly numbered elements. In addition to the RSSI blocks 234-238 and switching device 240, FIG. 6 includes a driver 350 that improves signal characteristics (power, loading, etc.) and an RSSI ADC 352 disposed in series therewith. RSSI ADC 352 is operable to receive an analog RSSI indication and to produce a corresponding digital RSSI value to baseband processor 216. In one embodiment of the invention, baseband processor 216 determines clipping is occurring in the receive signal path by determining that clipping is occurring at RSSI ADC 352. In another embodiment, baseband processor 216 determines that clipping is occurring at the signal path ADC 232 if a digital value of a signal strength indication received from RSSI ADC 352 exceeds a specified threshold. In yet another embodiment, baseband processor 216 merely evaluates an output of signal path ADC 232 to determine whether clipping is occurring and determines a maximum amount of gain that eliminates clipping by setting gain levels of amplification devices to unity (in any one of a specified number of orders) until clipping at the signal path ADC no longer occurs.

In comparing the topology of the wideband RSSI blocks 234 and 236 to the downstream signal paths relative to the sample point as shown in FIG. 5, it may be seen that the wideband RSSI blocks and the signal path both include low pass filters and amplifiers. As such, the baseband processor is able to gage the signal magnitude of the wideband signal by providing similar circuitry and is, more specifically, able to determine whether total amplification is resulting in clipping at the signal path ADC. As such, the baseband processor is able to determine a maximum total amount of gain that is allowable while avoiding clipping at the signal path ADC 232.

FIG. 7 is a functional block diagram illustrating a baseband processor 216 with RSSI selection logic according to one embodiment of the invention. Specifically, baseband processor 216 includes RSSI selection logic 354 that generates RSSI selection signals A, B and C for selecting an RSSI block whose signal strength indication is to be selectively produced to the baseband processor 216. As will be described in greater detail below, baseband processor 216 selects each of the RSSI blocks in a sequential manner to determine a maximum amount of allowable gain in the signal path and to determine whether to apply the majority of the gain in a front end or a back end of the signal path or to evenly apply the gain throughout the signal path in one embodiment of the invention.

Figure 8:
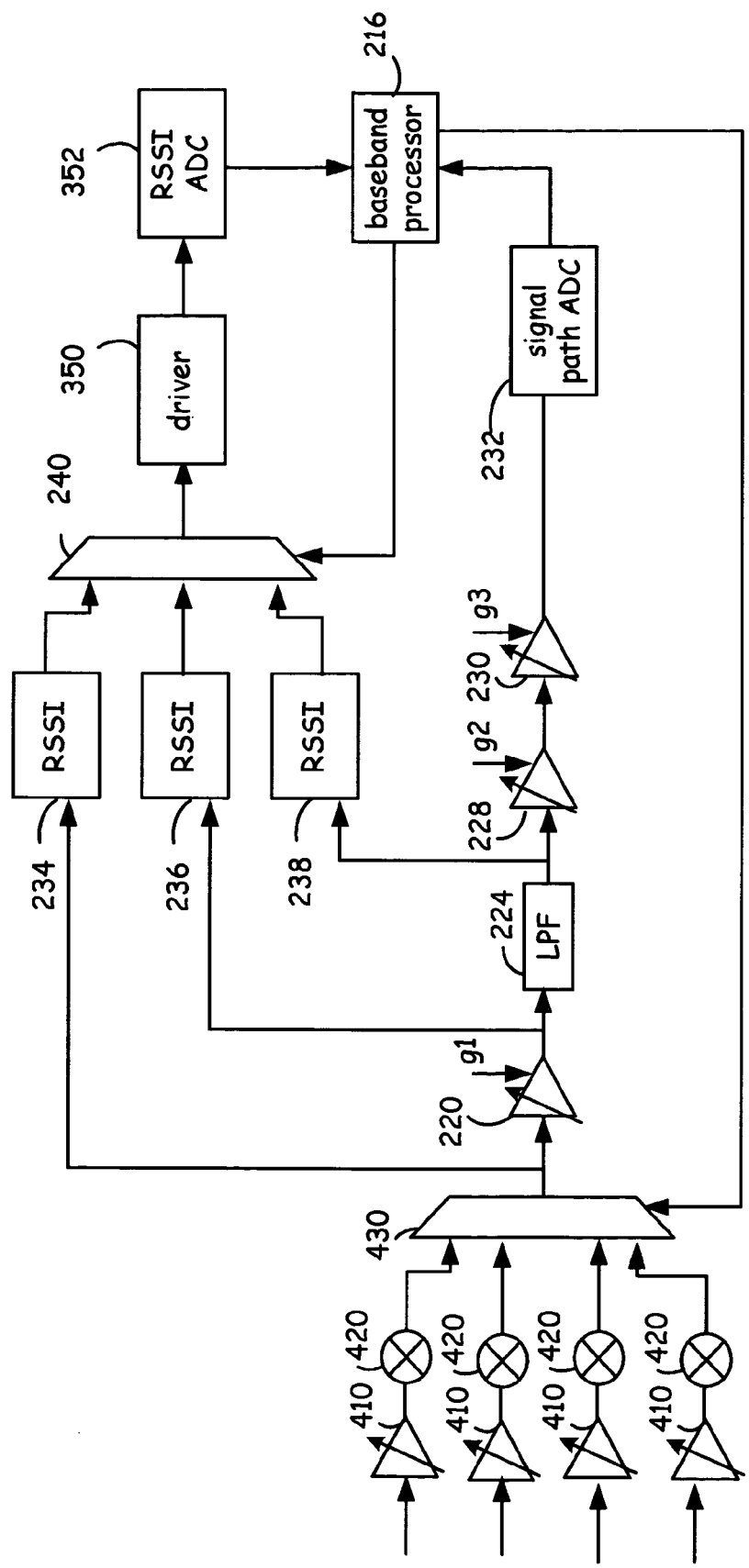
FIG. 8 is a functional block diagram of an integrated circuit radio transceiver in which common components of a receive signal path are shared between a plurality of receive signal paths according to an alternate embodiment of the invention.

FIG. 8 is a functional block diagram of an integrated circuit radio transceiver in which common components of a receive signal path are shared between a plurality of receive signal paths according to an alternate embodiment of the invention. Elements described in relation to the previously described figures are given the same reference numbers as before. Operation and structure is as discussed above for the commonly numbered elements. Comparing FIG. 8 to FIGS. 4 and 6, the elements downstream of the signal mixers are shared. To facilitate such sharing, a switching element is utilized to select a mixer output that is to be operatively coupled to the commonly shared receive signal path components. Thus, for example, a plurality of low noise amplifiers 410 are each coupled to a corresponding plurality of mixers 420 that perform in-phase and quadrature phase mixing to down-convert an ingoing signal to baseband (or IF) for two ingoing RF signal frequency bands. The down-converted output of each of the mixers 420 are then produced to a switch 430 which operatively couples a selected mixer output to the receive signal path and, more particularly, to an input of high pass variable gain amplifier 220. The operation of HP-VGA 220 and the other components downstream of switch 430 are as described above. As may be further seen, baseband processor 216 generates a control signal that is produced to switch 430 to select a mixer output of the four mixers 420. In this embodiment, the baseband processor is operable to generate four mixer select signals and three RSSI select signal to potentially receive twelve signal strength indications from only three RSSI blocks by generating select signals for every switching combination allowed by switching devices 430 and 240.

Figure 9:
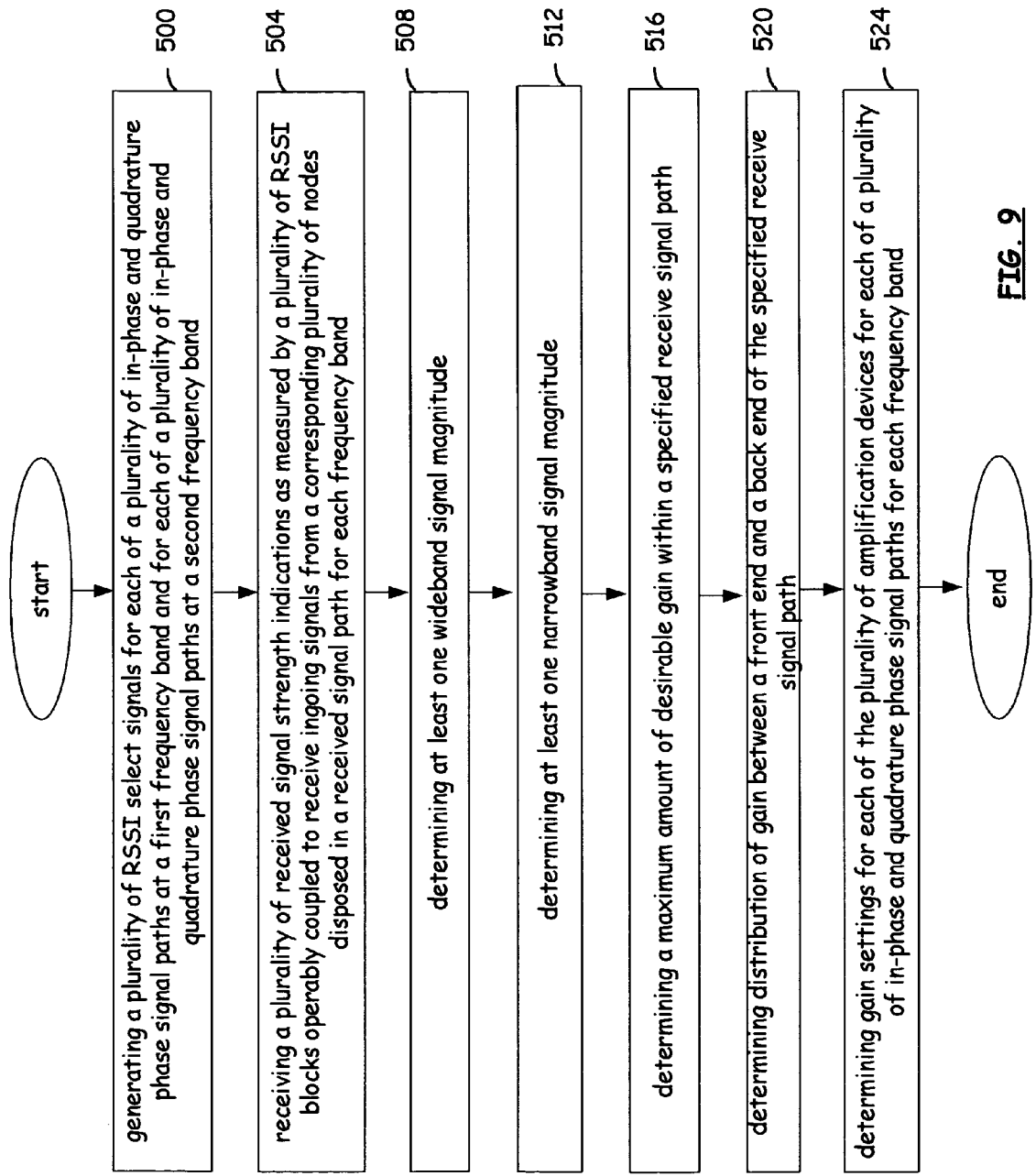
FIG. 9 illustrates a method for setting gain levels for a plurality of amplification devices within an integrated circuit radio transceiver according to one embodiment of the invention.

FIG. 9 is a flow chart illustrating a method for setting gain levels for a plurality of amplification devices within an integrated circuit radio transceiver according to one embodiment of the invention. Initially, a baseband processor generates a plurality of RSSI select signals for each of a plurality of in-phase and quadrature phase signal paths at a first frequency band and for each of a plurality of in-phase and quadrature phase signal paths at a second frequency band (step 500). In a radio configuration in which a plurality of radio front ends are provided to support operation at a plurality of frequency bands, a baseband processor is operable to set gain level settings for amplifiers within each receive path based upon received narrowband and wideband signal strength. To determine the proper gain level settings, however, the baseband processor selects each RSSI block within the signal paths to determine the received signal strength as measured by the corresponding RSSI block. Thus, the baseband processor individually selects each RSSI block in a sequential manner to receive a corresponding signal strength indication.

Thereafter, the baseband processor receives a plurality of received signal strength indications as measured by a plurality of RSSI blocks operably coupled to receive ingoing signals from a corresponding plurality of nodes disposed in a received signal path for each of a plurality of in-phase and quadrature phase signal paths at the frequency band and for each of a plurality of in-phase and quadrature phase signal paths at the second frequency band (step 504).

As a part of the described process, the baseband processor determines at least one wideband signal magnitude (step 508) and further determines at least one narrowband signal magnitude (step 512). These determinations are made from received signal strength indications from different RSSI blocks (in the described invention) that are operably coupled to nodes that are disposed upstream and downstream of a low pass filter, respectively. As a part of evaluating the wideband and narrowband signal magnitudes (at least generally, for example, it is within a specified threshold), the baseband processor determines whether clipping is a result of amplification by each of the amplification block, devices, or circuits for which a downstream received signal strength indication is measured. Thus, by evaluating an output of each amplification block, device or circuit, the baseband processor is able to determine an amount of gain that did not result in clipping from over amplification and an amount of amplification that did result in clipping of the received ingoing signal. Thus, the baseband processor is operable to determine a maximum amount of desirable gain within a specified receive signal path (step 516) and to further determine distribution of gain between a front end and a back end of the specified receive signal path (step 520).

After determining wideband and narrowband signal magnitudes, the maximum amount of gain, and distribution of gain between the front end and back end of a receive signal path, the baseband processor is operable to determine gain settings for each of the plurality of amplification devices for each of a plurality of in-phase and quadrature phase signal paths at the first frequency band and for each of a plurality of in-phase and quadrature phase signal paths at the second frequency band (step 524).

Figure 10:
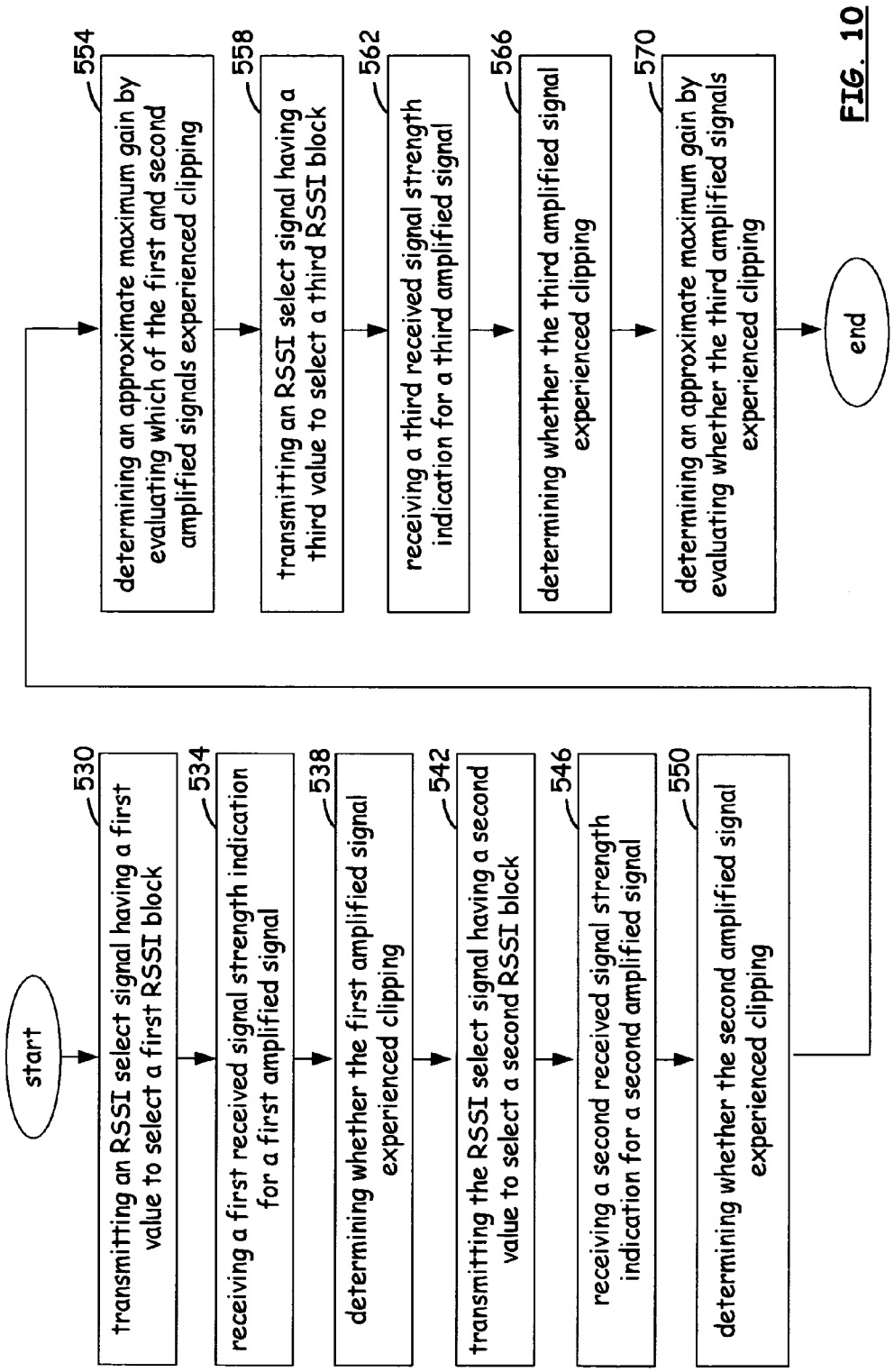
FIG. 10 is a flow chart illustrating a method for obtaining received signal strength indications from a plurality of RSSI blocks according to one embodiment of the invention.

FIG. 10 is a flow chart illustrating a method for obtaining received signal strength indications from a plurality of RSSI blocks according to one embodiment of the invention. Referring to FIG. 10, the described method includes transmitting an RSSI select signal having a first value to select a first RSSI block (step 530), receiving a first received signal strength indication for a first amplified signal (step 534) and determining whether the first amplified signal experienced clipping (step 538). Thereafter, the method according to the described embodiment further includes transmitting the RSSI select signal having a second value to select a second RSSI block (step 542), receiving a second received signal strength indication for a second amplified signal (step 546), and determining whether the second amplified signal experienced clipping (step 550). Thereafter, the method includes determining an approximate maximum gain by evaluating which of the first and second amplified signals experienced clipping (step 554).

In an embodiment of the invention that includes a third RSSI block, the method according to the described embodiment includes transmitting an RSSI select signal having a third value to select a third RSSI block (step 558) and receiving a third received signal strength indication for a third amplified signal (step 562). The method further includes determining whether the third amplified signal experienced clipping (step 566) and determining an approximate maximum gain by also evaluating whether the third amplified signals experienced clipping (step 570).

In the above described embodiment, referring back to FIG. 6, for exemplary purposes, the first RSSI block is the narrowband RSSI block 238 while the second and third RSSI blocks are wideband RSSI blocks 236 and 234, respectively. Thus, the baseband processor is operable to determine if the total gain provided by amplification devices in the receive path results in clipping and, if so, determine which amplification devices are providing the additional amplification that results in clipping. While the described embodiments illustrate just three RSSI blocks, it should be understood that more or less may be used. For example, additional RSSI blocks may be used to determine signal magnitude at nodes disposed after any one of high pass variable gain amplifiers 228 or 230 or low noise amplifier 210, each of which is operable to set gain levels according to a gain level setting received from the baseband processor.

Figure 11:
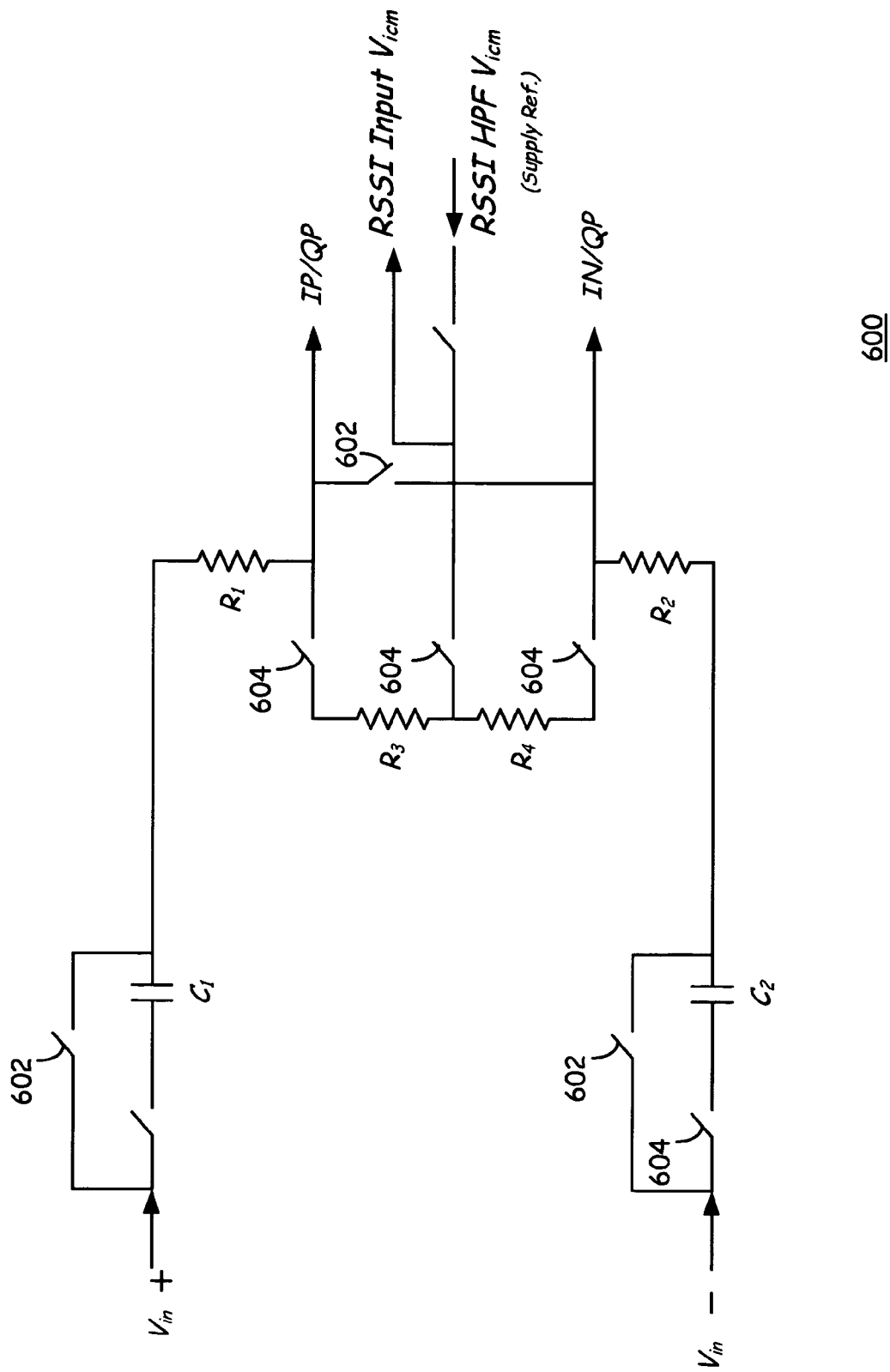
FIG. 11 is a functional schematic diagram of a wideband RSSI (WB RSSI) front-end according to one embodiment of the invention.

FIG. 11 is a functional schematic diagram of a wideband RSSI (WB RSSI) front-end according to one embodiment of the invention. Generally, the front end 600 of FIG. 11 is found in RSSI blocks 234 and 236 in the described embodiments of the invention which are operable to provide wide-band operation. The front end 600 illustrated in FIG. 11 provides a high-pass gain/bypass functionality centered to operate at 500 kHz and at 900 kHz (as a default) in the described embodiment. As such, the front end 600 is further operable to provide input offset voltage attenuation. In a default mode of operation, the circuit operates in a by-pass mode wherein logic closes the shown bypass switches 602 and opens switches 604 so that only high-pass resistors R1 and R2 are electrically present.

In an alternate mode, capacitors C1 and C2 as well as resistors R3 and R4 are switched into operative coupling by opening switches 602 and closing switches 604 to provide the high-pass gain functionality centered to operate at 500 kHz. In the described embodiment, C2=C1, R2=R1 and R4=R3. One of average skill in the art may readily determine values for C1, C2, R1-R4 according to design requirements without undue experimentation. A differential input signal is produced as shown to the inputs of C1 and C2 and their corresponding by-pass switches 602. The outputs are IP/QP, IN/QN and RSSI $V_{icm}$ as shown wherein RSSI $V_{icm}$ is common mode signal.

FIG. 12 is a functional block diagram of amplification circuitry for wide-band RSSI blocks according to one embodiment of the invention. The amplification circuitry 610 in the embodiment of FIG. 12 is operably disposed to receive the outputs of the circuit of FIG. 11. Thus, the EP/QP and IN/QN outputs of FIG. 11 are received at the inputs of envelope detector 612 which is operable to produce an amplified envelope value based upon a peak to peak difference of the input signals IP/QP and IN/QN. The amplified envelope value is then produced to a low pass filter 614 which is operable to low pass filter the amplified envelope. In the described embodiment, the low pass filter 614 defines a low pass corner frequency of 500 kHz. In an alternate configuration, the low pass corner is equal to 1 MHz.

The low pass filtered envelope is then produced to a buffer 616. The RSSI $V_{icm}$ produced by the output of the circuit of FIG. 11 is also received at an input of buffer 616 wherein the buffer 616 produced a buffered difference of the common mode signal RSSI $V_{icm}$ and the low pass filtered envelope and produces the buffered difference to an amplifier that includes an operational amplifier 618 (in the described embodiment of the invention) whose gain is set by a ratio of R2 to R1. In the described embodiment, the low pass corner of 500 kHz is the default value.

FIG. 13 is a functional schematic diagram of an envelope detector according to one embodiment of the invention. Referring to FIG. 13, the topology is operable to determine an absolute value of the differential inputs received at MOSFET transistors M1 and M2 in the described embodiment with a DC shift and with minimal compression during the input transitions. However, the gate-to-source voltage of the input devices M1 and M2 is quite large, introducing significant distortion. Therefore, a pseudo replica circuit comprising of an identical differential voltage follower (M3 & M4) and a feedback amplifier 614 is used to provide a first-order cancellation of the DC voltage and distortion due to the input devices. The feedback amplifier 614 keeps the voltages Vap and Van equal, by driving the gate of the replica circuits (M3 and M4) to the envelope of the differential signals. The current sources (sinks) shown generally at 616 provide biasing for M1-M4 which are N-channel MOSFETs in the described embodiment. FIG. 14 is a schematic diagram of a level shifter as implemented in one embodiment of the invention. The circuit of FIG. 14 is operable to receive an input signal and to produce a level shifted output based upon values of $I_{ref}$ and the BIAS signal. FIG. 15 is a differential amplifier that is used in one embodiment of the invention for providing amplification of a narrow band RSSI signal. The gain of the amplifier is based upon the ratio of R2 to R1 as configured about amplifier 630.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. An integrated circuit radio transceiver, comprising:
   a baseband processor for processing ingoing and outgoing digital communication signals;
   a transmitter front end operable to transmit outgoing RF signals based upon the outgoing digital communication signals;
   a receiver front end operable to produce the ingoing digital communication signals based upon received ingoing RF signals, the receiver front end including:
   a first frequency in-phase receive processing block;
   a first frequency quadrature phase receive processing block;
   a second frequency in-phase receive processing block;
   a second frequency quadrature phase receive processing block; and
   wherein each of the in-phase and quadrature phase receive processing blocks are disposed in parallel between at least one low noise amplifier that produces the ingoing RF signals and the processor, each of the in-phase and quadrature phase receive processing blocks further including:
   a low pass filter;
   high pass variable gain amplifiers disposed substantially in series with the low pass filter defining a signal path wherein at least one is disposed upstream of the low pass filter; and
   at least three received signal strength indicator blocks for producing a corresponding received analog signal strength indication from receive signal path nodes in the signal path wherein:

at least two of the receive signal path nodes are disposed on opposite sides of at least one of the high pass variable gain amplifiers disposed upstream of the low pass filter; and at least two of the received signal strength indicator blocks, that are operably coupled to the at least two of the receive signal path nodes, include circuitry for removing a DC offset.

2. The integrated circuit radio transceiver of claim 1 wherein each of the in-phase and quadrature phase receive processing blocks further include a switching device coupled to receive signal strength indications from the at least three received signal strength indicator blocks, the switching device for selectively producing at least one corresponding received signal strength indication from the corresponding signal strength indicator block.

3. The integrated circuit radio transceiver of claim 2 wherein each switching device selectively produces the at least one corresponding received signal strength indication based upon a control signal received from the baseband processor.

4. The integrated circuit radio transceiver of claim 1 wherein the first frequency is approximately equal to 2.4 gigahertz (GHz).

5. The integrated circuit radio transceiver of claim 4 wherein the second frequency is approximately equal to 5.0 gigahertz (GHz).

6. The integrated circuit radio transceiver of claim 1 wherein the radio front end is operable to communicate over a plurality of communication protocols or standards at the same time.

7. The integrated circuit radio transceiver of claim 1 wherein a first receiver front end is operable to communicate according to 802.11(a) communication standards requirements and wherein a second receiver front end is operable to communicate according to 802.11(g) communication standards requirements.

8. The integrated circuit radio transceiver of claim 1 wherein the first receive signal path node is an input to the first high pass variable gain amplifier.

9. The integrated circuit radio transceiver of claim 1 wherein the second receive signal path node is an input to the low pass filter.

10. The integrated circuit radio transceiver of claim 1 wherein the third receive signal path node is an input to the second high pass variable gain amplifier.

11. An integrated circuit radio transceiver, comprising:
transmit path processing circuitry;
at least one receive path processing block; and
wherein the at least one receive path processing block further includes:
a first high pass variable gain amplifier for producing a first amplified output;
a first low pass filter for producing a filtered output based upon the first amplified output;
a second high pass variable gain amplifier for producing a second amplified output based upon the filtered output;
a third high pass variable gain amplifier for producing a third amplified output based upon the second amplified output;
at least two nodes disposed at separate inputs of any one of the first, second and third high pass variable gain amplifiers and the first low pass filter;
at least three received signal strength indicator blocks that are each operably coupled to detect a signal strength of an ingoing signal at one of the at least three nodes to produce first, second and third signal strength indications, respectively, the first, second and third received signal strength indicator block coupled to detect an analog signal strength wherein at least two of the nodes are disposed upstream of the first low pass filter and wherein at least two of the at least three received signal strength indicator blocks are operably coupled to the upstream nodes and include circuitry for reducing a DC offset;

switching circuitry coupled to receive the first and second signal strength indications for selectively producing one of the signal strength indications to a baseband processing block; and wherein the first received signal strength indicator block further includes:
an absolute value detection block operable to produce an absolute value indication based upon the ingoing signal; and
a second low pass filter for producing a filtered absolute value based upon the absolute value indication.

12. The integrated circuit radio transceiver of claim 11 wherein the absolute value detection block comprises a source follower amplifier configuration.

13. The integrated circuit radio transceiver of claim 11 wherein the first received signal strength indicator block further includes a buffer for buffering the filtered absolute value to produce a buffered and filtered absolute value.

14. The integrated circuit radio transceiver of claim 13 further including an amplifier block for producing an amplified signal strength indication based upon the buffered and filtered absolute value.

15. The integrated circuit radio transceiver of claim 14 wherein the second received signal strength indicator block consists of an amplifier block.

16. The integrated circuit radio transceiver of claim 15 wherein the third received signal strength indicator block is comprised of an equivalent structure of the first received signal strength indicator block.

17. An integrated circuit radio transceiver, comprising:
baseband processor for processing ingoing and outgoing digital communication signals;
transmitter front end for processing and transmitting outgoing RF signals based upon the outgoing digital communication signals;
receiver front end comprising an ingoing signal path for receiving ingoing RF signals and for processing the ingoing RF signals to produce the ingoing digital communication signals;
a plurality of filtering and amplification blocks disposed within the ingoing signal path;
at least three received signal strength indicator blocks coupled to receive an ingoing analog signal from a corresponding plurality of nodes disposed throughout the ingoing signal path, each of the plurality of received signal strength indicator blocks producing an analog signal strength indication; and
wherein at least two of the nodes are disposed upstream of the first low pass filter and wherein at least two of the at least three received signal strength indicator blocks are operably coupled to the upstream nodes and include circuitry for reducing a DC offset.

18. The integrated circuit radio transceiver of claim 17 wherein each of the plurality of received signal strength indicator blocks flirt her includes analog-to-digital conversion circuit for producing the signal strength indication as a digital signal.

19. The integrated circuit radio transceiver of claim 18 farther including switching circuit wherein the baseband processor is operable to generate an RSSI select signal to the switching circuit to select a desired signal strength indication.

20. The integrated circuit radio transceiver of claim 17 wherein each of the plurality of received signal strength indicator blocks produces the signal strength indication in a digital form to the baseband processor.

21. An integrated circuit radio transceiver, comprising:
baseband processor for processing ingoing and outgoing digital communication signals;
transmitter front end operable to transmit outgoing RF signals based upon the outgoing digital communication signals;
receiver front end operable to produce the ingoing digital communication signals based upon received ingoing RF signals, the receiver front end including:
first frequency in-phase receive processing block;
first frequency quadrature phase receive processing block;
second frequency in-phase receive processing block;
second frequency quadrature phase receive processing block;
wherein each of the in-phase and quadrature phase receive processing blocks are disposed in a substantially parallel manner between at least one antenna and the processor, each of the in-phase and quadrature phase receive processing blocks farther including:
a mixer block operably coupled to receive a local oscillation and to produce a down-converted ingoing signal;
a common receive path processing block farther including:
a low pass filter;
first, second and third high pass variable gain amplifiers disposed substantially in series with the low pass filter defining a common receive signal path; and
three received signal strength indicator blocks for producing a corresponding received signal strength indication of an analog signal from first, second and third receive signal path nodes in the signal path that includes the low pass filter and the first, second and third high pass variable gain amplifiers disposed substantially in series wherein at least two of the nodes are disposed upstream of the first low pass filter and wherein at least two of the at least three received signal strength indicator blocks are operably coupled to the upstream nodes and include circuitry for reducing a DC offset;
first switching circuit operable to couple the down-converted ingoing signal from any one of the in-phase or quadrature phase receive processing blocks to an input device of the common receive path processing block wherein the input device comprises one of the low pass filter and the first, second or third high pass variable gain amplifiers; and
second switching circuitry operable to couple the corresponding received signal strength indication to the baseband processor.

* * * * *

UNITED STATES PATENT AND TRADEMARK OFFICE
CERTIFICATE OF CORRECTION

| | | |
|---|---|---|
| PATENT NO. | : 7,668,514 B2 | Page 1 of 1 |
| APPLICATION NO. | : 11/264392 | |
| DATED | : February 23, 2010 | |
| INVENTOR(S) | : Adedayo Ojo and Arya Reza Behzad | |

It is certified that error appears in the above-identified patent and that said Letters Patent is hereby corrected as shown below:

Column 18, line 65, in Claim 18: replace "flirt her" with --further--.

Column 19, line 2, in Claim 19: replace "farther" with --further--.

Column 19, line 27, in Claim 21: replace "farther" with --further--.

Column 20, line 1, in Claim 21: replace "farther" with --further--.

Signed and Sealed this

Twenty-first Day of September, 2010

David J. Kappos
*Director of the United States Patent and Trademark Office*